United States Patent [19]

Lababia Del Fresno

[11] Patent Number: 5,072,665
[45] Date of Patent: Dec. 17, 1991

[54] TOASTER

[75] Inventor: Miguel Lababia Del Fresno, San Sebastian, Spain

[73] Assignee: Oficina de Investigacion Agrupada, Spain

[21] Appl. No.: 364,196

[22] Filed: Jun. 9, 1989

[30] Foreign Application Priority Data

Jun. 14, 1988 [ES] Spain .................................. 8801905

[51] Int. Cl.⁵ .......................... A47J 37/08; H01H 3/14
[52] U.S. Cl. .................................... 99/391; 200/5 R; 219/480
[58] Field of Search ................ 99/325, 327, 328, 385, 99/386, 389, 390, 391; 219/480, 486, 487, 398; 200/5 R

[56] References Cited

U.S. PATENT DOCUMENTS

| 2,092,226 | 9/1937 | Simons, Jr. ........................ 99/391 X |
| 2,879,707 | 3/1959 | Ambrose ............................... 99/328 |
| 2,930,874 | 3/1960 | Andrews .......................... 219/486 X |
| 3,201,564 | 8/1965 | Hutt .................................... 219/486 X |
| 3,364,338 | 1/1968 | Holtkamp .......................... 219/398 |
| 3,800,691 | 4/1974 | Eaton, Jr. et al. .................... 99/391 |
| 4,065,659 | 12/1977 | Yount et al. ........................ 219/398 |
| 4,345,513 | 8/1982 | Holt .................................... 99/391 X |
| 4,517,452 | 5/1985 | Krasznai et al. ................ 219/398 X |

Primary Examiner—Harvey C. Hornsby
Assistant Examiner—Scott J. Haugland
Attorney, Agent, or Firm—Lucas & Just

[57] ABSTRACT

A toaster is provided with independent electric feeding for the classical two resistances which take part therein, so that the toasting effect may be supplied to only one of the two surfaces of the slice of bread, or to the two sides as is conventional.

For this purpose, either two independent contactors are used, corresponding to the two resistances, which can act independently with the assistance of a movable wedge or be obliged to act simultaneously, in which case the resistances are fed through a diode, or else the said resistances are fed through two commutation transistors and from an electronic control and adjusting circuit provided with a temporizer and which is assisted by two push-buttons, one for selecting the resistances and the other for stop/release.

2 Claims, 2 Drawing Sheets

TOASTER

OBJECT OF THE INVENTION

The present invention relates to a toaster, specifically of the type destined to toast slices of bread or any other like product and which uses two resistances or a set of electric resistances as a heat source, between which the slice or slices of bread to be toasted are positioned.

BACKGROUND OF THE INVENTION

Toasters are known to be provided with a framework, inside which are established two electroresistances housed inside two quartz tubes, such resistances being placed next to the inner surface of the larger side walls of the framework and defining a middle receptacle where the slices of bread to be toasted are positioned, delimited by two grids which prevent direct contact of the bread with the resistances, at the same time as the bottom of the said receptacle is provided with an ejecting plate which can move towards the bottom of such receptacle by means of an external lever, can be locked in such position and is automatically released by action of a thermostat or adjustable programmer, likewise causing the slices of bread to be ejected automatically outside the receptacle.

These toasters are generally acceptable when used for toasting slices of packed bread or any other like product, which requires the same amount of heat supply to the two larger surfaces thereof. It is however increasingly frequent for the classical "pices of toast" to be obtained from normal bread, instead of packed bread, i.e., bread with crust, generally cutting a small loaf in half lengthwise. This means that when the half-loaf is introduced into the toaster, whilst one of its sides offers crumbs to one of the heat sources of the said toaster, the other side offers a duly cooked crust which will however receive the same thermal treatment, which also means that for the crumb to be duly toasted the crust shall be unduly hardened and sometimes even burnt.

This restricts the use of the toasters, and requires the use of a grill to obtain such pieces of toast, which is slower and more elaborate than using toasters of the aforesaid type.

DESCRIPTION OF THE INVENTION

The toaster set forth by the invention has been designed and structured in order to allow its use both as a conventional toaster of this type and as an "asymmetric" toaster, with only one heat source positioned on one of the side walls of the receptacle thereof, so as to allow open loaves of normal bread to be toasted, supplying heat only to the outside of the same, i.e., on the surface opposed to the crust.

For this purpose the toaster of the invention, whilst maintaining the structure of a conventional toaster in relation to the existence of a framework, a pair of resistances or sets of side resistances protected by two grids, an ejecting plate fitted with the corresponding lever and a temporizer, centres its characteristics in that each of the two resistances, initially connected in parallel in the toaster circuit, is fitted with an independent contactor, the two contactors being transversally aligned and being assisted by a wedge which may move transversally, so that the said wedge may simultaneously affect the two contactors or just one of them, on being acted on by an external knob, which plays in a window of the toaster framework and the positions of which are obviously duly indicated.

The said external knob, and more specifically the movable wedge being integral with the same, is obviously related to the external control lever of the toaster, so that after moving the knob to the position chosen for such purpose, on acting on the external control lever the feeding circuit of one or both resistances shall be closed, and therefore the toaster shall work as a conventional toaster, generating heat onto the two sides of the slice to be toasted, or else generating heat onto only one of such sides, whenever the nature of the slice so requires.

In accordance with a varying embodiment of the toaster, the above described electomechanical solution may be replaced by an electronic solution where the resistances connected in parallel are specifically fed through two commutating transistors and from an electronic control and adjusting circuit acted on by two push-buttons, one to change the functional situation of the apparatus, from one to two resistances, and the other to stop operation of the toaster, at any time, independently of the temporizer related to the said electronic circuit and which may be adjusted, such electronic circuit also acting on the electromechanical locking and releasing device toast ejector, which is in itself conventional.

DESCRIPTION OF THE DRAWINGS

In order to complement the description being made and to assist a better understanding of the characteristics of the invention, a set of drawings is attached to the present specification as an integral part thereof wherein the following has been shown in an illustrative and non-limiting manner.

PREFERRED EMBODIMENT OF THE INVENTION

Figure 1:
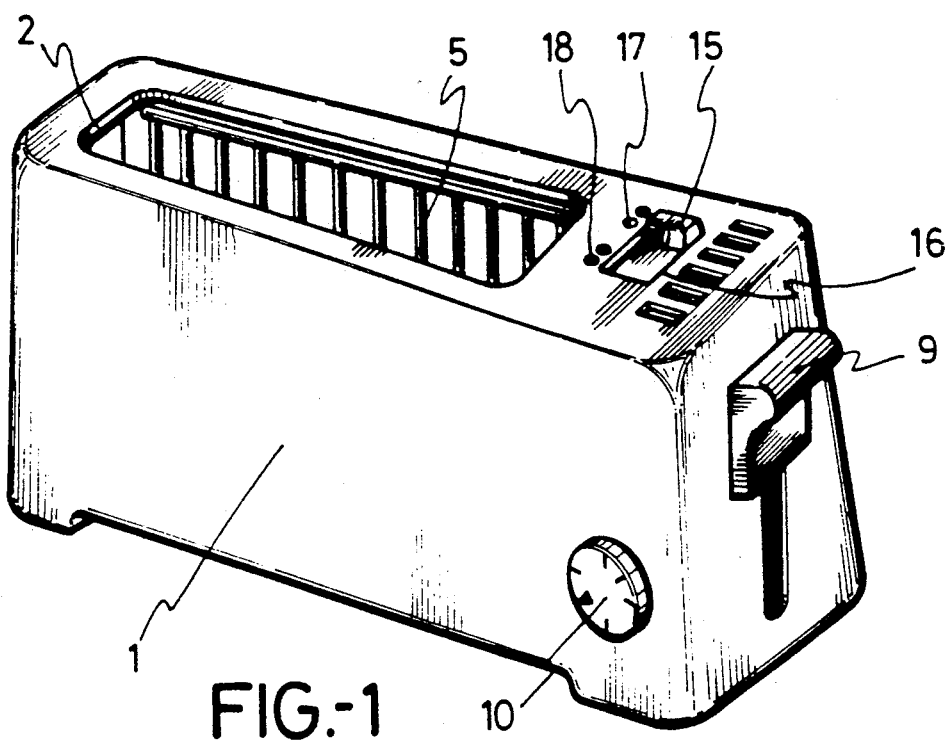
FIG. 1 is a perspective view of a toaster made in accordance with the object of the present invention.
Figure 2:
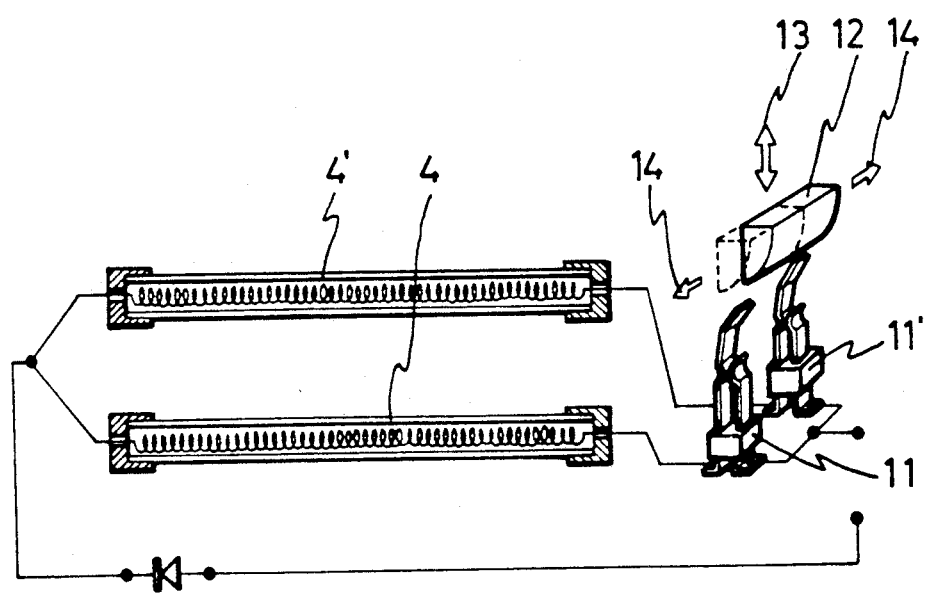
FIG. 2 is a part-diagrammatic view of the heating circuit of the said toaster, with the movable driving wedge thereof.
Figure 3:
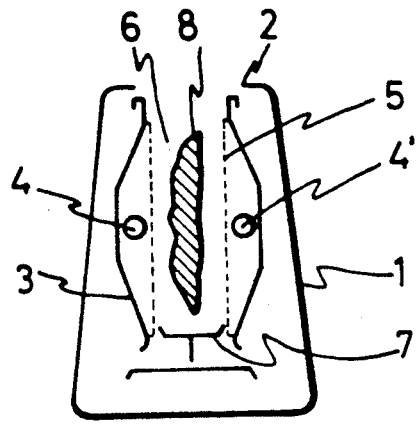
FIG. 3 shows a likewise diagrammatic cross section of the said toaster.

In the light of these figures it may be observed that the toaster of the invention is constituted by a framework 1, having any design where a wide opening 2 is defined for access to the operative area thereof, which is framed by two side and reflecting screens, immediately inside which are established two electrical resistances 4—4', preferably of the spiral type and housed within quartz tubes, as shown in FIG. 2, such resistances being insulated by means of internal and side grids 5, defining a receptacle 6, on the bottom of which is established the classical ejecting plate 7, which receptacle is destined to hold the slice or slices of bread 8 to be toasted, which ejecting plate 7 may be drawn in with the assistance of an external control lever 9 actuation whereof not only causes the said ejecting plate 7 to be drawn in and locked, but connection of the electric resistances 4, the ejecting plate being automatically released once the slices have attained the foreseen toasting situation, by means of a thermostat or an adjuster, provided with the corresponding external control knob 10.

Now then, from this basic structure, the toaster of the invention centres its characteristics on the fact that, as shown in FIG. 2, the resistances 4—4' connected in parallel are provided with respective contactors 11—11' which determine a likewise independent operation for one and other resistances.

This pair of contactors 11—11', duly positioned within the framwork 1 in a transversal alignment, is assisted by a wedge 12 which in addition to being vertically displaceable in the direction of arrow 13, in order to activate and disactivate the contactors 11, may also be displaced transversally, following arrows 14, in order to be opposed to the two contactors 11 or only to one of them, so that depending on the said position one or both electric resistances 4 and 4' are fed.

For this purpose, the displaceable wedge 12 forms an integral part of the external knob 15 which plays in a window 16 of the upper base of the framework, such knob determining the possibility of taking up two positions, one corresponding to the feeding of any one of the resistances 4 or 4' indicated at 17, and the other where the feeding corresponds to the two resistances, indicated at 18.

This wedge 12-knob 15 assembly, is duly related to the external control lever 9 of the toaster, so that after locating the knob 15 in the chosen work position, one or both resistances are connected, in the conventional downward displacement of the control lever 9 in order to lock the ejecting plate 7 when drawn in.

Therefore, and in accordance with the above description, the toaster may act as a conventional toaster, when the knob 15 takes up position 18 and consequently the wedge 12 acts on the two contactors 11—11', or else the said toaster may act in an "asymmetric" manner, only one of the electric resistances 4 and 4' thereof being operative, specifically when the knob 15 takes up position 17 and the wedge 12 only acts on one of the contactors 11.

Although the practical embodiment shown in the figures has only two positions for the control knob 15, it is clear that the said knob may be established in three positions, specifically a middle position where the two resistances are operative, an end position where one of them is operative and a further end position where the opposite resistance is operative, without this affecting the essence of the invention.

It should finally be pointed out that the diode depicted in the circuit of FIG. 2, as it only conducts in middle wave, not only converts the alternating current into a pulsed continuous current, but reduces the efficient voltage to one half, and therefore the intensity also decreases in the same proportion, thereby allowing, when the network voltage is 220 V, the use of a thicker wire for the resistances 4 and 4' specifically in order that the said wire may be self-supporting.

Figure 4:
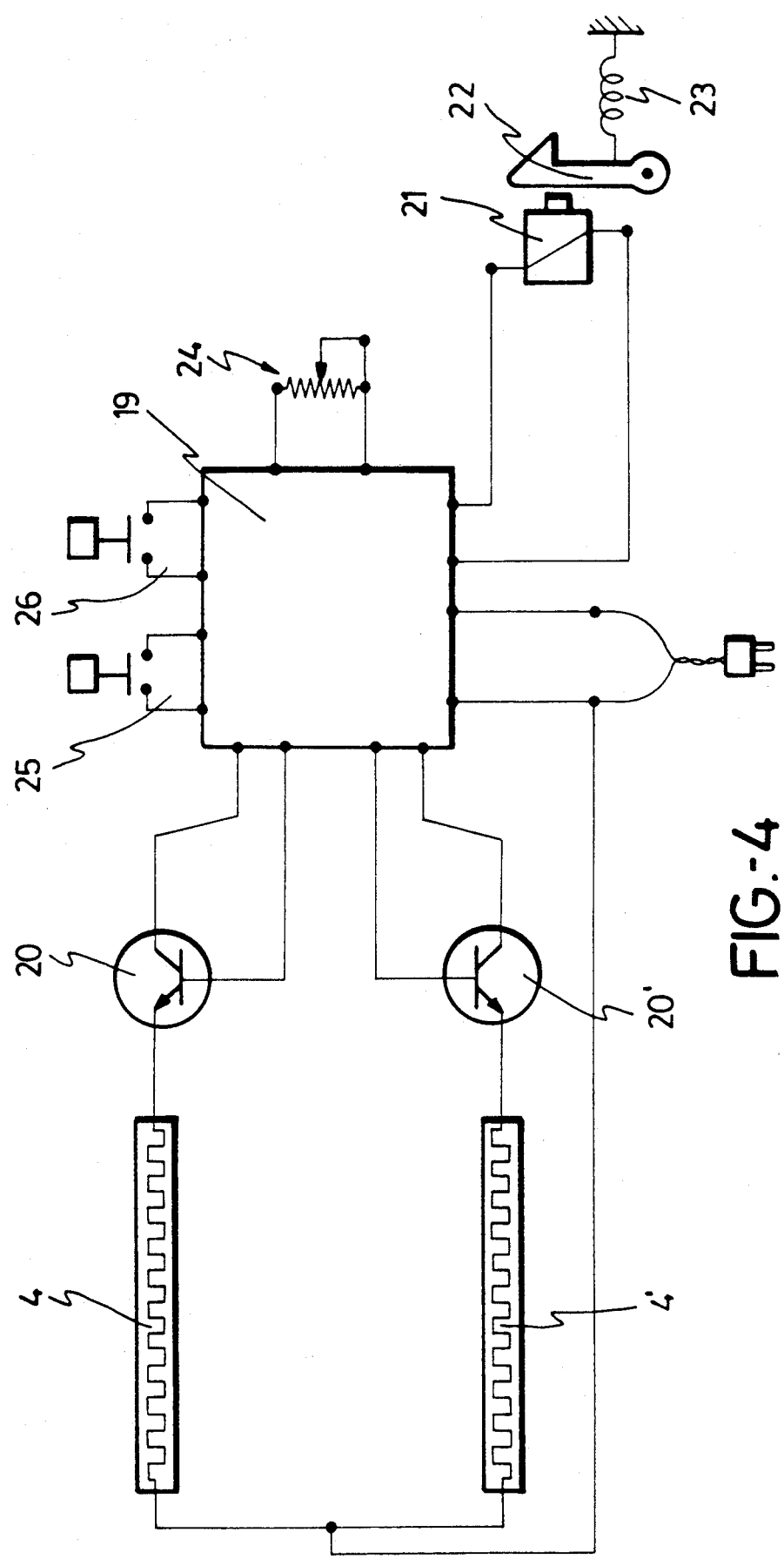
FIG. 4 finally shows the diagram corresponding to the varying embodiment of the toaster where the resistances thereof are electronically controlled.

Optionally, and as shown in FIG. 4, the resistances 4—4', whilst maintaining their connection in parallel, may be controlled from an electronic control and adjusting circuit 19, through respective commutation transistors 20—20', which electronic circuit shall also control the classical electromechanical locking and releasing device for the toast ejector, normally constituted by an electromagnet 21 which is stimulated when electricity goes through the same from circuit 19 and which activates a claw 22, which may swing against a spring 23 and which locks or releases the said ejector.

The control and adjusting circuit 19 is fitted with a temporizer 24, provided with the corresponding adjusting control, in order to establish the functional temporizing of one or both resistances 4—4'.

Furthermore, the electronic control and adjusting circuit 19 is fitted with a push-button 25 through which the operative positions of the toasters are alternatively changed, from one to two resistances, and a further stop or release push-button 26, which causes feeding to the resistances 4—4' to be stopped when it is acted on, independently of the temporising established at 24.

I claim:

1. In an improved toaster having a framework with two heating resistors the toaster having grids protecting each resistor from contact with the item to be toasted, the grids defining the sides of a toasting receptacle wherein the item to be toasted is placed for toasting, the toaster having an ejecting plate which defines the bottom of the toasting receptacle, the toaster having an external control lever which controls the ejecting plate, the ejecting plate being capable of being locked in a toasting position when the external control lever is in its toasting position, the ejecting plate being releasable for automatic ejection of the toasted item, the toaster having an adjusting temporizer which controls the releasing of the ejecting plate, the improvement comprising:

(a) the toaster having a diode capable of energizing the resistors;
  (b) the resistors being connected in parallel and energized through the diode, the resistors having corresponding independent contactors which activate the resistors; and
  (c) a wedge which is vertically movable from a non-contact position to a contact position, the wedge in the contact position contacting the contactors, the wedge also being transversely movable in order to selectively contact only one or both of the contactors and thus selectively activating only one or both of the corresponding resistors.

2. The improved toaster of claim 1 further comprising an external knob and a window in the framework of the toaster, the external knob being in the window and integral to the wedge, the wedge able to be positioned in at least two positions, one position corresponding to one contactor being contacted and thus the one corresponding resistor being activated, and another position where both contactors are contacted and thus both corresponding resistors are activated.

* * * * *